Figure 1:
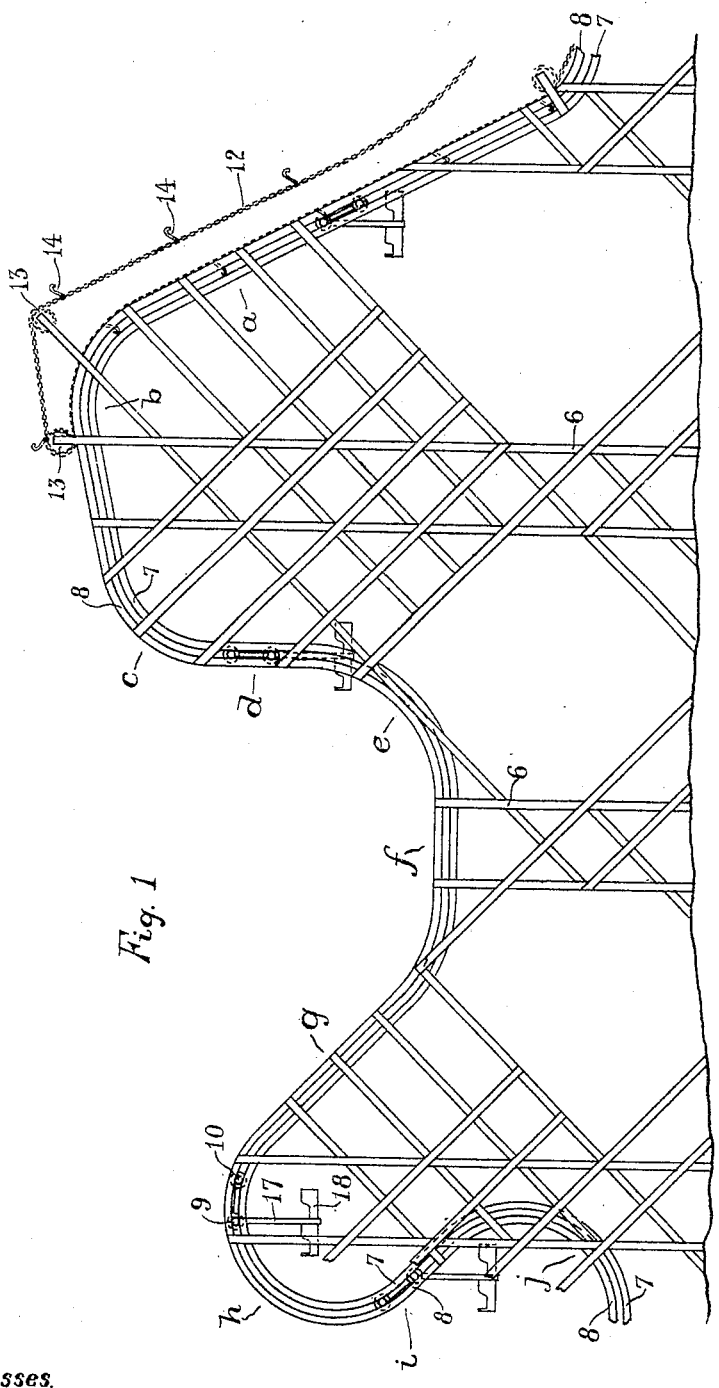

No. 803,679. PATENTED NOV. 7, 1905.
E. S. ENSIGN.
PLEASURE RAILWAY.
APPLICATION FILED AUG. 21, 1905.

2 SHEETS—SHEET 1.

Witnesses.
C. H. Emerson
Francis E. Smith

Inventor.
Emory S. Ensign,
By Charles F. H. Smith.
Attorney

No. 803,679. PATENTED NOV. 7, 1905.
E. S. ENSIGN.
PLEASURE RAILWAY.
APPLICATION FILED AUG. 21, 1905.
2 SHEETS—SHEET 2.
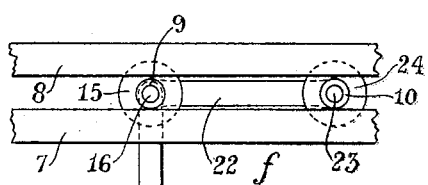
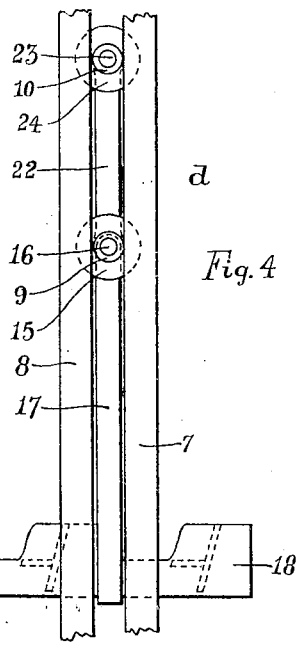
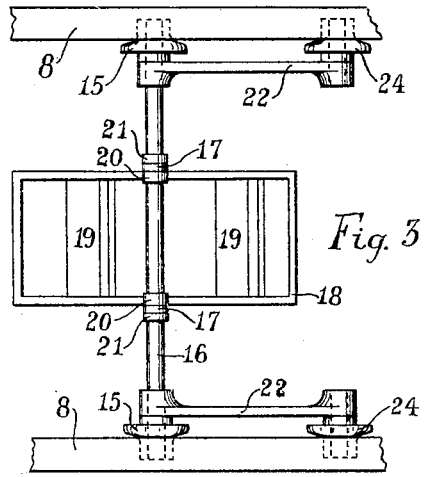
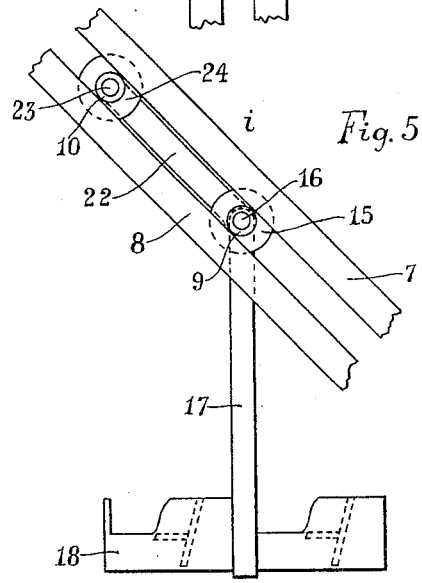
Witnesses.
C. H. Emerson
Francis E. Smith
Inventor.
Emory S. Ensign.
By Charles F. A. Smith
Attorney.

UNITED STATES PATENT OFFICE.

EMORY S. ENSIGN, OF CAMBRIDGE, MASSACHUSETTS, ASSIGNOR OF ONE-TENTH TO CHARLES F. A. SMITH, OF BOSTON, MASSACHUSETTS.

PLEASURE-RAILWAY.

No. 803,679.  Specification of Letters Patent.  Patented Nov. 7, 1905.

Application filed August 21, 1905. Serial No. 275,042.

*To all whom it may concern:*

Be it known that I, EMORY S. ENSIGN, a citizen of the United States, residing at Cambridge, in the county of Middlesex and State of Massachusetts, have invented certain new and useful Improvements in Pleasure-Railways, of which the following is a specification, reference being had therein to the accompanying drawings.

This invention has relation to improvements in pleasure-railways in order to give to the occupants of the cars carried by the trucks along the line of the railway certain new sensations not experienced while riding in the cars run upon other pleasure-railways. The principal sensation to be experienced is that of the "drop" when the truck of the car passes into the vertical portion and falls suddenly downward with or without the wheels revolving. Another novel sensation is that caused by the truck passing rapidly down the forward precipitous portion when the wheels of the truck slide along upon the rails instead of revolving upon the rails. Another novel sensation is caused by the truck turning upside down in passing onto the rearward extending portion and also in the sudden change from riding forward to riding backward. Still another sensation is that caused by the truck passing rapidly down the rear precipitous portion when the occupants of the car are rapidly carried downward and rearward while riding backward, and, finally, in the sudden change from riding backward to riding forward.

The invention also relates to improvements in cars to be used upon a railway so constructed.

With these objects in view the invention consists in the novel construction of parts and their arrangement and aggroupment in operative combination, as will be hereinafter fully and particularly pointed out and distinctly claimed.

I have fully and clearly illustrated the improvements in the accompanying drawings, to be taken as a part hereof, and wherein—

Figure 1 is a side elevation of the pleasure-railway and a side elevation of a preferred form of a truck and its hanging car to be used thereon. In this figure the car is shown as ascending, dropping, going in a circle, and precipitated backward with the truck upside down. Fig. 2 shows in side elevation, on a larger scale, the preferred form of such a truck and car running on horizontal rails. Fig. 3 is a plan view of the same. Fig. 4 is a side elevation of the same, showing the truck and its car dropping down a vertical section of the track. Fig. 5 is a side elevation of the same with the truck upside down, showing it passing down a rearward-extending precipitous portion of the track.

The same reference characters indicate the same parts in the different figures.

In the preferred form of the railway, as shown in Fig. 1, it will be seen that the structural posts 6 support and brace a pair of parallel lower rails 7 and a pair of parallel upper rails 8. These rails extend parallel to each other the entire length of the railway-track. The track may form many twists and curves formed by combinations of the portions of the track which I have shown in Fig. 1 and which I divide for convenience of explanation into (*a*) the ascending portion, common to most pleasure-railways, in which the truck is conveyed or hauled to the starting-point; (*b*) the starting-point, consisting of a track gradually sloped, common to all pleasure-railways; (*c*) the concaved track leading to the vertical portion; (*d*) the vertical portion, down which the car drops; (*e*) the convexed portion used in a great many pleasure-railways, but which is used in mine preferably for the wheels to pick the revolutions necessary for the increased movement of the car; (*f*) the horizontal portion common to all; (*g*) the upward incline, up which the car is carried by its own momentum, also generally used in pleasure-railways of the present time; (*h*) the outer semicircular curve; (*i*) the precipitous rearward incline, and (*j*) the inner semicircular curve.

Between the upper and lower rails 7 and 8 the wheels 9 and 10 revolve, and the wheels are firmly held between these rails to prevent the truck from falling from off the track.

Any means for raising the truck from the lowest point of the track to the gravity starting-point *b* may be used. In the drawings I have shown an endless conveyer-chain 12, (having any suitable means for operating it,) passing over a series of rollers or gears 13 and having a plurality of gripper-hooks 14, secured at proper intervals to said chain for gripping a portion of the truck and carrying the same upward until it frees itself by its own forward motion. As such means for conveying a truck to the gravity starting-point of a pleasure-railway are many and well understood and as it forms no part of this invention, I will not herein further describe or illustrate it.

The truck is preferably made of metal and consists of a pair of forward wheels 9, having flanges 15 and connected by an axle 16, upon which axle is pivotally swung the arms 17 of the car 18, provided with one or more seats 19. These arms are held from side movement upon the axle 16 by the braces 20 and 21; but the car is so swung upon the truck that it retains a horizontal or nearly horizontal position at all times, even though the car is dropping straight downward, as shown in Fig. 4, when the occupants of the car receive the same sensations as when dropping in a parachute, or even though the truck has been reversed upside down, as in Fig. 5, and the occupants are being precipitated rearward and downward while sitting backward.

Pivoted upon the axle 16 near the flanges 15 of the forward wheels 9 and extending rearward is a pair of parallel bars or arms 22, having studs 23, upon which rotates the rear wheels 10 of the truck, which wheels are provided with the flanges 24; but these arms 22 are so arranged as not to be in the way of the car 18 as it is swung around the truck or as the truck is swung around it.

Having thus fully described my invention, what I claim as new is—

1. In a pleasure-railway, a track having a downward-extending portion in combination with a truck adapted to run on the track and fall through the downward-extending portion.

2. In a pleasure-railway, a track provided with a vertical portion in combination with a truck having a car swinging therefrom so that when the truck drops down the vertical portion the car remains in a horizontal position.

3. In a pleasure-railway, a track provided with a diagonally backward extending portion in combination with a truck having a car swinging from its shaft and so arranged that the car can revolve around the truck as the truck follows the contour of the track.

4. In a pleasure-railway, a track having sections thereof laid so that a truck passing over it will roll up, roll down, drop down, roll forward, and roll rearward upside down, in combination with a truck provided with an axle connecting one pair of wheels, a car swinging downward from the axle, studs extending inward from the other pair of wheels and bars connecting the studs and axle and all so arranged that the car always remains in nearly a horizontal position as the truck passes over the track, substantially as shown and described.

In testimony whereof I affix my signature in presence of two witnesses.

EMORY S. ENSIGN.

Witnesses:
CHARLES F. A. SMITH,
ELLA M. PITTS.